United States Patent [19]
Abe et al.

[11] Patent Number: 6,122,020
[45] Date of Patent: Sep. 19, 2000

[54] FRAME COMBINING APPARATUS

[75] Inventors: Shuji Abe; Akiyoshi Kato, both of Kanagawa-ken; Hideo Tsurufusa, Tokyo, all of Japan

[73] Assignee: Kabushiki Kaisha Toshiba, Kawasaki, Japan

[21] Appl. No.: 08/893,298

[22] Filed: Jul. 15, 1997

[30]     Foreign Application Priority Data

Jul. 16, 1996  [JP]  Japan ................................. 8-186248

[51] Int. Cl.[7] .................................................. H04N 7/12
[52] U.S. Cl. ...................... 348/845.2; 348/388; 348/426; 348/721; 370/468
[58] Field of Search ............................... 348/845.2, 388, 348/389, 426, 487, 721; 370/468; H04N 7/12

[56]            References Cited

U.S. PATENT DOCUMENTS

| 5,115,309 | 5/1992 | Hang ........................................ 348/388 |
| 5,430,486 | 7/1995 | Fraser ...................................... 348/426 |
| 5,526,051 | 6/1996 | Gove ........................................ 348/388 |
| 5,633,683 | 5/1997 | Rosengren ............................... 348/385 |

FOREIGN PATENT DOCUMENTS 6-268981   9/1994   Japan .

OTHER PUBLICATIONS

Yashima, et al., An HDTV Codec Implementation Based on MPEG2 and Picture Quality Evaluation, Technical Report of IEICE, IE95–112 (1996–02), pp. 1–8.

*Primary Examiner*—Howard Britton
*Attorney, Agent, or Firm*—Pillsbury Madison & Sutro, LLP

[57]            ABSTRACT

A frame combining apparatus, having a plurality of decoding means for decoding frame data for each of a plurality of sub-frames through a decoding process opposite to a coding process when a plurality of coded data streams obtained by coding frame data of a frame divided into a plurality of sub-frames are input, a synchronizing means for generating external synchronizing data for defining output timings of decoded outputs from a plurality of decoding means, and a delaying means for generating more than one external synchronizing data delayed by a delay time corresponding to a plurality of sub-frames in response to the division of a frame and to give the external synchronizing data from the synchronizing means and external synchronizing data having a delay time corresponding to the divided sub-frames out of more than one delayed external synchronizing data to decoding means corresponding to the sub-frames, respectively.

5 Claims, 7 Drawing Sheets

FRAME COMBINING APPARATUS

FIELD OF THE INVENTION

The present invention relates to a high-definition moving picture coding apparatus which is suited for dividing, compressing, transmitting, expanding and processing high-definition moving pictures.

BACKGROUND OF THE INVENTION

In recent years, the digital processing of frames is in wide spread. As a method for compressing and coding frame data, such high-efficiency coding as MPEG (Moving picture Experts Group), etc. are adopted. By the way, a capacity required for the coding process differs depending on a spatial resolution of frames. For instance, a spatial resolution of frame signals of high-definition moving pictures such as Hi-Vision pictures, etc. is higher than that of the current NTSC signals, and for the high-efficiency coding of these frame signals by the digital signal processing while maintaining their characteristics, an extremely higher processing capacity than the high-efficiency coding of the current NTSC signals is demanded.

On the other hand, a processing capacity of circuitry is remarkably progressed as a result of the advancement of semiconductor architecture, etc. but there is no cheap apparatus available for the high-efficiency coding of such high-definition moving pictures at present. However, even if processors have relatively low processing capacity, when they are arrayed in parallel with each other, higher processing capacity can be obtained. In other words, when cheap coding apparatus with a low-resolution for current NTSC signals are used by connecting them in parallel with each other, it is possible to code high-definition pictures.

That is, for a high-definition picture data, it is divided into n-pieces (n≧2) of low-resolution sub-frames and each of these sub-frames is coded using a coding apparatus with a low-resolution. FIG. 10 illustrates this division of frame and shows an example of coding of sub-frames A, B of a frame halved vertically.

FIG. 9 and FIG. 11 are block diagrams illustrating a conventional frame combining apparatus for performing the coding or decoding of a frame by dividing it into two sub-frames.

A high-definition picture signal that is input through an input terminal is given to a frame divider 2. The frame divider 2 divides a frame into sub-frames A, B, as shown in FIG. 10 and outputs frame data of these sub-frames to coders 3, 4, respectively. The coders 3, 4 perform the coding corresponding to, for instance, MPEG standard.

By the way, in a coded data stream such as MPEG data stream, a time stamp is inserted so as to tune a decoding timing. A clock circuit 5 generates clock data that becomes a reference for this time stamp and supplies to the coders 3, 4. The coders 3, 4 code input frame data of the sub-frames A, B, respectively. In the coded data streams from the coders 3, 4, a time stamp is inserted.

The coded data streams from the coders 3,4 are recorded on prescribed recording media through recorders 6, 7. Further, the coded data streams from the coders 3, 4 may be transmitted by a transmitter (not shown).

In addition, the coded data streams from the coder 3, 4 may be supplied to a recomposer 8. The coded data streams from the coders 3, 4 are recomposed to a single data stream by the recomposer 8 and transmitted by a transmitter 9. Further, the output of the recomposer 8 may be recorded by a recording device (not shown).

FIG. 11 is a block diagram illustrating a decoder for reconstructing an original high-definition picture signal from the coded data streams recorded to the recorders 6, 7 or transmitted through the transmitter 9 in FIG. 9.

Reproduction devices 11, 12 reproduce the coded data recorded by the recording devices 6, 7, as shown in FIG. 9 and output to decoders 13, 14, respectively. Further, the coded data streams may be supplied to the decoders 13, 14 from the transmitter 9. The transmitter 9 separates a coded data stream corresponding to the coder 3 at the coding section and a coded data stream corresponding to the coder 4 each other and supplies to the decoders 13, 14, respectively.

The decoders 13, 14 are given with synchronizing data from a synchronizer 15 for reconstructing original frame data from the input coded data streams by conducting the decoding process. The decoded output of the decoder 13 is supplied to a frame combiner 17, while the decoded output of the decoder 14 is supplied to the frame combiner 17 via a delay circuit 18.

The decoded output of the decoder 13 corresponds to the sub-frame A, while the decoded output of the decoder 14 corresponds to the sub-frame B. Accordingly, it is necessary to delay the decoded output of the decoder 14 from the decoded output of the decoder 13 by a ½ field period. The decoded output of the decoder 14 is supplied to the frame combiner 17 delayed by a ½ field period according to the delay circuit 18.

The frame combiner 17 combines two input decoded outputs and outputs the combined decoded output via an output terminal 19. An original high-definition picture signal, as shown in FIG. 12, can be reconstructed by displaying it based on the frame data from the output terminal 19.

When a frame is divided into n-pieces of sub-frames and applied with the coding process as described above, a memory for delaying frames is needed for properly combining sub-frames in addition to memories that are used by decoders for reconstructing original frames and there was such a problem that a circuit scale will increase.

As described above, in a conventional frame combining apparatus described above, there was a problem that a frame memory is required and the circuit scale increase.

SUMMARY OF THE INVENTION

The present invention was made in view of the problem described above. It is, therefore, an object of the present invention to provide a frame combining apparatus that is capable of reducing the circuit scale.

In order to achieve the above object, a frame combining apparatus according to one aspect of the present invention includes a plurality of decoding means for reconstructing frame data of a frame divided into a plurality of sub-frames by processing a plurality of input coded data streams obtained by coding them for each of a plurality of sub-frames by the decoding process opposite to the coding process; a synchronizing means for generating external synchronizing data defining output timings of decoded outputs from the plurality of decoding means; and a delaying means for generating more than one external synchronizing data which are external synchronizing data from the synchronizing means delayed by a delay time corresponding to the plurality of sub-frames according to the division of a frame and give external synchronizing data from the synchronizing means and external synchronizing data which are delayed by a delay time corresponding to each sub-frame out of more than one external synchronizing data having a delay time corresponding to each sub-frame, A frame combining apparatus according to another aspect of the present invention includes a plurality of coding means to obtain a plurality of coded data streams by dividing a frame into a plurality of sub-frames and coding frame data of each sub-frame; a clock means for generating clock data for the plurality of coding means to obtain a time reference when performing the decoding; a delaying means for generating more than one clock data from the clock means, which are delayed by a delay time corresponding to the plurality of sub-frames according to the division of a frame; and a plurality of time stamp adding means to insert time information based on clock data of delay time corresponding to the sub-frames out of clock data from the clock means and clock data from the delaying means into coded data streams corresponding to respective sub-frames and output the data streams, and a frame combing apparatus according to still another aspect of the present invention includes a plurality of decoding means for reconstructing frame data of a plurality of sub-frames through the decoding process opposite to the coding process when a plurality of coded data streams obtained by coding frame data of a frame divided into a plurality of sub-frames for each of a plurality of sub-frames are input; a synchronizing means for generating synchronizing data defining the output timings of the decoded outputs from a plurality of decoding means; and a delaying means for generating more than one synchronizing data from the synchronizing means delayed by a delay time corresponding to each of a plurality of sub-frames according to the division of the frame and give the synchronizing data of the delay time corresponding to each of the sub-frames out of the synchronizing data from the synchronizing means and more than one delayed synchronizing data to the decoding means corresponding to each of the sub-frames.

In the frame combining apparatus according to the first aspect of the present invention, the coded data streams of the sub-frames are respectively decoded in a plurality of decoding means. The decoding means output the reconstructed frame data obtained by the decoding at the time of external synchronizing data. External synchronizing data from the synchronizing means is given to the delaying means and after delayed by a delay time according to the frame division and supplied to the corresponding decoding means. As a result, the output timing of each decoding means is delayed. The delay time is corresponding to the frame division and the output timing of each decoding means is corresponding to the display timing. As a result, an original frame is reconstructed without delaying the output of the decoding means.

In the frame combining apparatus according to the second aspect of the present invention, frame data of the sub-frames are coded by a plurality of coding means and a plurality of coded data streams are obtained. These plural coded data streams are output with time information inserted by the time stamp adding means. Clock data from the clock means is delayed by a delay time according to the frame division and supplied to the corresponding time stamp adding means by the delaying means. As a result, time information corresponding to the position of each sub-frame in the frame is inserted into the coded data stream corresponding to each sub-frame. Thus, an original frame is reconstructed without delaying the decoded output by performing the decoding with reference to the time information at the time of the decoding.

In the frame combining apparatus according to the third aspect of the present invention, the coded data streams of the sub-frames are respectively decoded in a plurality of decoding means. The decoding means output reconstructed frame data obtained by the decoding at the timing of synchronizing data. The synchronizing data from the synchronizing means is given to the delaying means and supplied to the corresponding decoding means later by a delay time according to the frame division. As a result, the output timing of each decoding means is delayed. The delay time is corresponding to the frame division and the output timing of each decoding means is corresponding to the display timing. Thus, an original frame is reconstructed without delaying the output of each decoding means.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 1 through 8.

Figure 1:
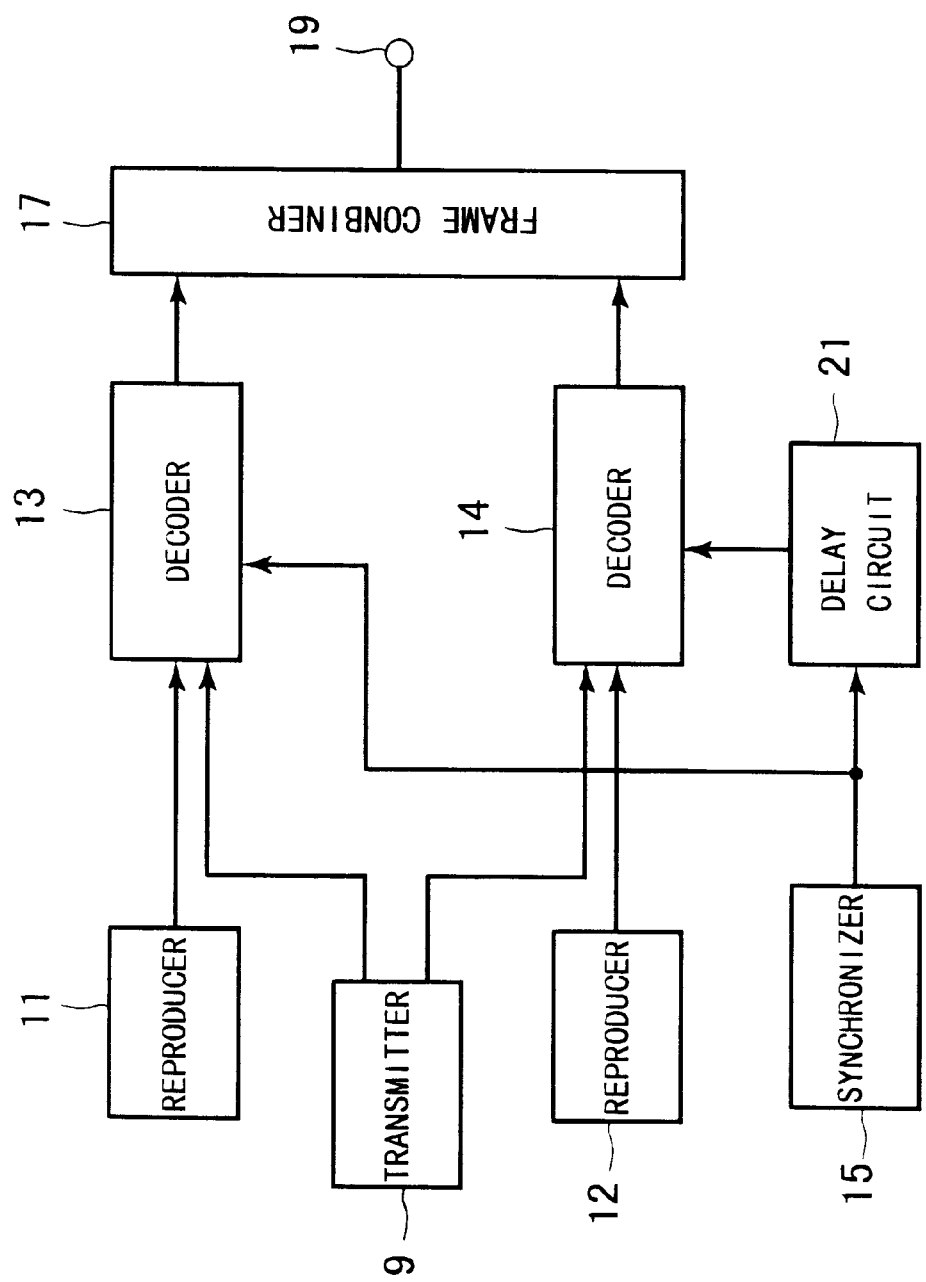
FIG. 1 is a block diagram illustrating one embodiment of a frame combining apparatus of the present invention.
Figure 2:
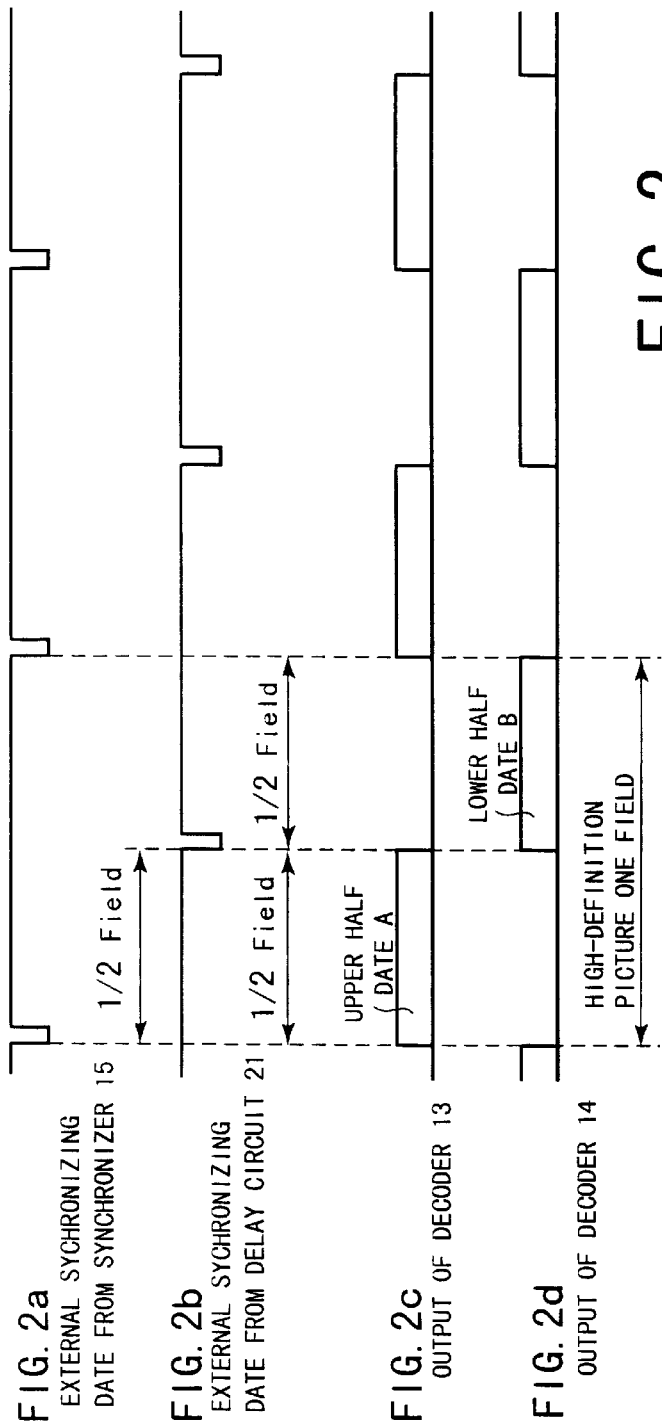
FIGS. 2a through 2d are timing charts for explaining the operation of the embodiment of FIG. 1.
Figure 11:
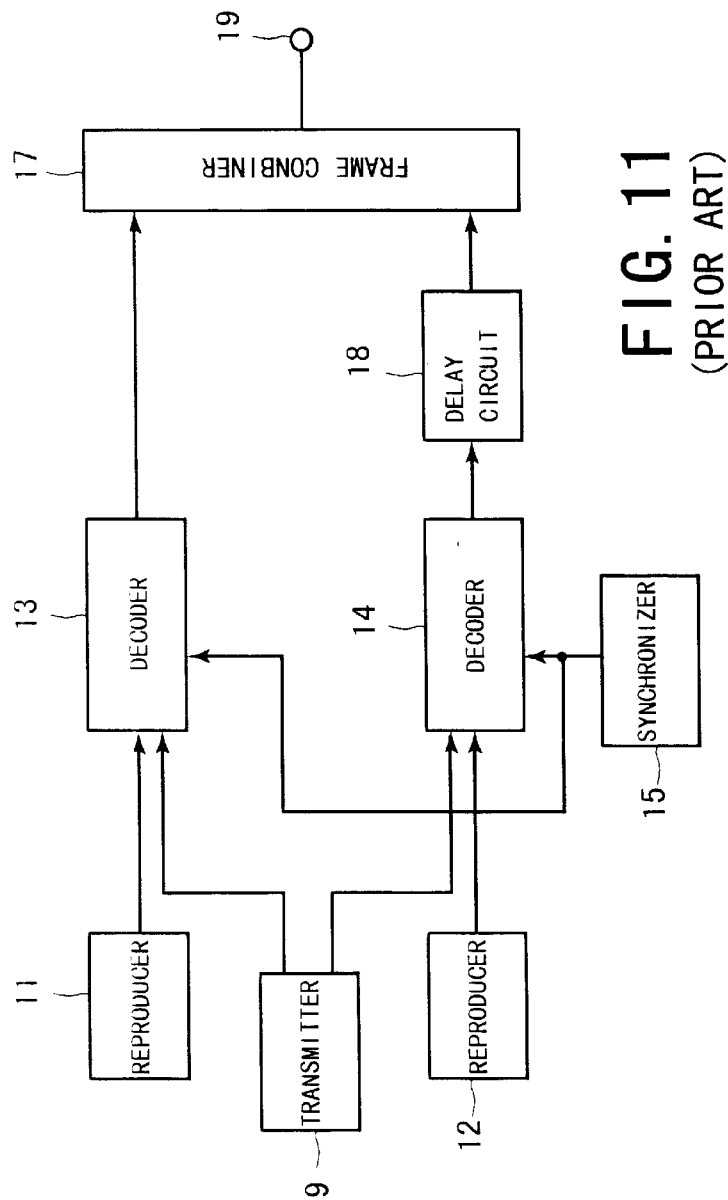
FIG. 11 is a block diagram illustrating a conventional frame combining apparatus.
Figure 12:
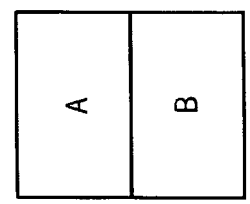
FIG. 12 is a diagram for explaining a conventional example of FIG. 11.

FIG. 1 is a block diagram illustrating one embodiment of a frame combining apparatus of the present invention. This embodiment is an example of the embodiment applied to a decoder which reconstructs one frame that was divided into upper and lower halves and coded from the coded data streams. In FIG. 1, the same component elements as those in FIG. 11 are assigned with the same reference numerals.

At the coding section, one high-definition picture signal is divided into upper and lower sub-frames and coded data stream obtained by coding frame data of the sub-frame A corresponding to the upper half of the frame and a coded data stream obtained by coding frame data of the sub-frame B corresponding to the lower half of the frame are recorded on recording media, respectively. The reproducers 11, 12 reproduce these recording media (not shown). The reproducer 11 outputs the coded data stream corresponding to the sub-frame A to the decoder 13, while the reproducer 12 outputs the coded data stream corresponding to the sub-frame B to the decoder 14. Further, to the decoders 13, 14, coded data streams corresponding to the sub-frames A, B may be directly input via transmission paths (not shown) from the coding section.

Further, in coded data streams developed at the coding section, a time stamp is inserted so as to tune the decoding timing. For instance, when coded data streams are corresponding to MPEG standard, a decoding time stamp (DTS), a presentation time stamp (PTS), a system clock reference (SCR), etc. are inserted as a time stamp.

Further, at the coding section, a coded data stream corresponding to the sub-frame A and a coded data stream corresponding to the sub-frame B may be combined again into a single stream and transmitted or recorded. The transmitter 9 transmits a coded data stream that is recomposed into a single stream, supplies coded data corresponding to the sub-frame A in the transmitted data stream to the decoder 13 and supplies coded data corresponding to the sub-frame B to the decoder 14. Further, the coded data stream that is recomposed into a single stream is recorded on a recording medium (not shown), reproduced by a reproducer (not shown) and coded data streams corresponding to the sub-frames A, B may be supplied to the decoders 13, 14, respectively.

The synchronizer 15 generates an external synchronizing data that becomes an output time reference of reconstructed frame data from the decoders 13, 14 and output to the decoder 13 and a delay circuit 21. In this embodiment, the delay circuit 21 outputs the external synchronizing data to the decoder 14 by delaying it by a delay time based on the frame division in the coder. Further, if one field frame is halved into the upper and lower halves, a delay time will become a ½ field period.

The decoders 13, 14 reconstruct an original frame data by conducting the decoding process opposite to the coding process at the coding section to the input coded data streams. The decoders 13, 14 execute the decoding while comparing time information contained in the input coded data streams with clock data of an internal clock (not shown). The decoders 13, 14 output the reconstructed frame data obtained through the decoding process at input external synchronizing data timings.

An input rate of coded data streams that are input to the decoders 13, 14 differs from an output rate of the reconstructed frame data. The decoders 13, 14 are able to store data by a buffer (not shown) retained in the inside until the decoding timing by accumulating and holding input coded data streams.

In this embodiment, the output timing of the reconstructed frame data of the decoder 14 is later than the output timing of the reconstructed frame data of the decoder 13 by, for instance, a ½ field period. As the input rate of coded data streams input to the decoders 13, 14 is relatively small, the data amount of the compressed input signal becomes small in compared with the data amount of the output signal. Thus it is possible to absorb the coded data streams delayed by the ½ field period according to the buffer in the decoder 14.

The reconstructed frame data from the decoders 13, 14 are supplied to the frame combiner 17. The reconstructed frame data from the decoder 14 is output at a timing later than the reconstructed frame data at the position on the sub-frame corresponding to the decoder 13 by a ½ field period. The frame combiner 17 reconstructs an original high-definition picture by combining the input reconstructed frame data and outputs the reconstructed original frame via an output terminal 19.

Figure 3:
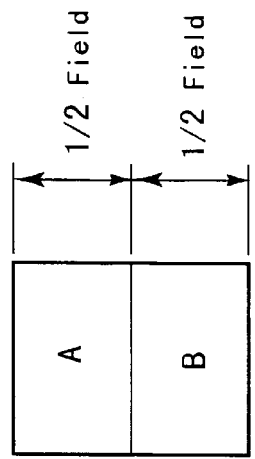
FIG. 3 is a diagram for explaining the embodiment of FIG. 1.

Now, the operation of the embodiment in the structure as described above will be explained with reference to a timing chart, as shown in FIGS. 2*a* through 2*d* and an explanatory diagram, as shown in FIG. 3. FIG. 2*a* shows the external synchronizing data from the synchronizer 15; FIG. 2*b* shows the external synchronizing data from the delay circuit 21; FIG. 2*c* shows the output of the decoder 13, and FIG. 2*d* shows the output of the decoder 14. FIGS. 2*a* through 2*d* show also the case of that the decoders 13 and 14 operate at a double speed mode. If however they operate at a normal speed mode, the frame combiner 17 can be so designed to operate in such a double speed mode in place of the decoders 13 and 14, thus easily obtaining the results the same as described above. FIG. 3 shows a reconstructed high-definition picture.

At the coding section, a coded data stream corresponding to the sub-frame A at the upper half of a high-definition picture displayed on the screen and a coded data stream corresponding to the sub-frame B at the lower half of the frame are prepared. For instance, these coded data streams are recorded on recording media, respectively. The reproducers 11, 12 obtain a coded data stream corresponding to the sub-frame A and a coded data stream corresponding to the sub-frame B by reproducing these recording media. The coded data stream corresponding to the sub-frame A is supplied to the decoder 13 and the coded data stream corresponding to the sub-frame B is supplied to the decoder 14.

The synchronizer 15 generates external synchronizing data of vertical period as illustrated in FIG. 2*a* and outputs the data to the decoder 13 and the delay circuit 21. This external synchronizing data is supplied to the decoder 14 delayed by, for instance, a ½ field period according to the delay circuit 21 as illustrated in FIG. 2*b*.

At the coding section, when coding each of the sub-frames, the coding is executed in order from the upper left portion of the sub-frames A, B illustrated in FIG. 3. In other words, as to the coded data of the portions corresponding to the sub-frames A, B, time information are in accord with each other. The decoders 13, 14 execute the decoding while comparing the time information inserted in the coded data streams with the clock data of the internal clocks. The decoders 13, 14 output the reconstructed frame data at the timing of the input external synchronizing data. The external synchronizing data that is input to the decoder 14 is delayed from the external synchronizing data that is input to the decoder 13 by a ½ field period, and the decoder 14 outputs the reconstructed frame data at the timing later than the decoder 13 by a ½ field period.

Accordingly, the reconstructed frame data (FIG. 2*d*) at the position corresponding to the sub-frame B, that is output from the decoder 14, is output at the timing delayed by a ½ field period against the reconstructed frame data (FIG. 2*c*) of the sub-frame A output from the decoder 13. The frame combiner 17 combines the reconstructed frame data from the decoders 13, 14 and outputs the high-definition picture data via the output terminal 19. As the output of the decoder 14 is later than the output of the decoder 13 at the corresponding position on the frame by a ½ field period, it is possible to reconstruct a high-definition picture having the sub-frame B under the sub-frame A (FIG. 3) by simply combining the outputs of the decoders 13, 14.

As described above, in this embodiment a time difference of ½ field is provided for the output timings of the decoded results of the decoders 13, 14 by delaying the external synchronizing data by, for instance, a ½ field period. As the input rate of the coded data streams to the decoders 13, 14 is sufficiently smaller than the output rate of the reconstructed frames, it is possible to decode the coded data streams realtime even when a time difference is provided between their output timings by utilizing buffers provided in the decoders 13, 14. As a result, it becomes possible to omit a memory for delaying reconstructed frame data from the decoder 14 by a ½ field period and it is also possible to reconstruct a high-definition picture using a simple means only for delaying external synchronizing data by a ½ field period, for instance, a memory of small capacity and thus, a circuit scale can be made small.

Figure 4:
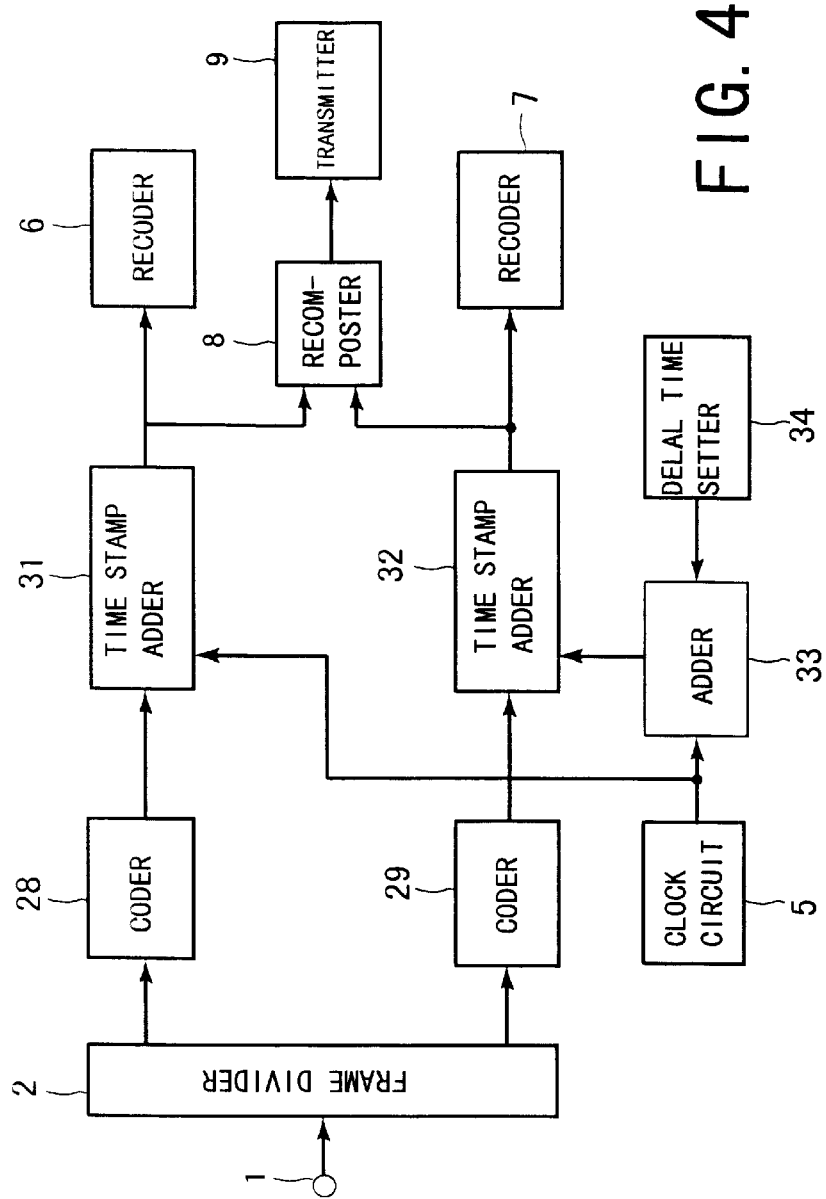
FIG. 4 is a block diagram illustrating another embodiment of the present invention.
Figure 9:
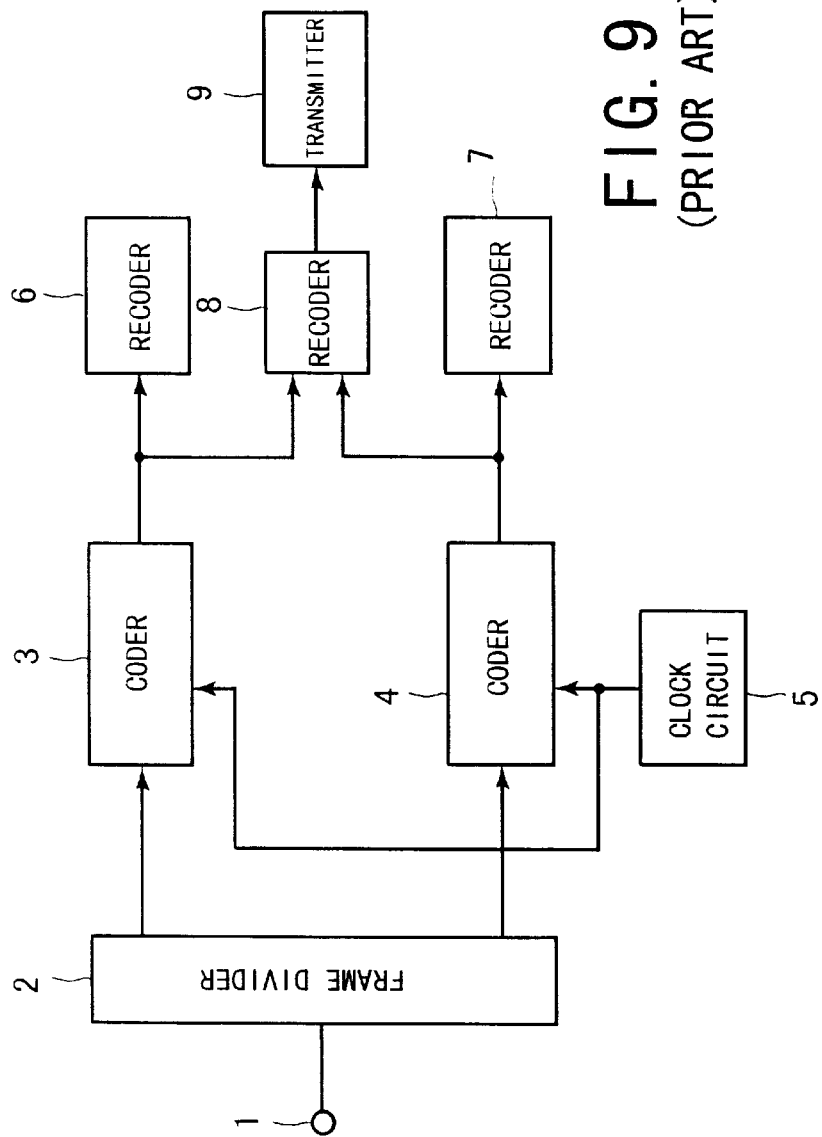
FIG. 9 is a block diagram illustrating a conventional frame combining apparatus.
Figure 10:
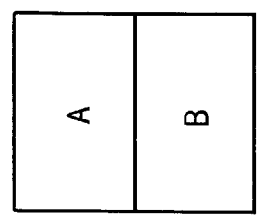
FIG. 10 is a diagram for explaining a conventional example of FIG. 9.

FIG. 4 is a block diagram illustrating another embodiment of the present invention. This embodiment is an example of this invention applied to a coder for coding a frame by dividing it into two sub-frames. In FIG. 4, the same component elements as those in FIG. 9 are assigned with the same reference numerals.

Figure 5:
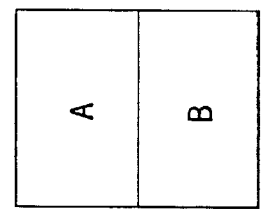
FIG. 5 is a diagram for explaining the embodiment of FIG. 5.

Frame data of a high-definition picture is input to an input terminal 1. A frame divider 2 divides a frame data that is input through the input terminal 1 according to the position on the frame. FIG. 5 shows an example of a dividing method. In the example of FIG. 5, the frame divider 2 divides a high-definition picture into the sub-frame A at the upper half of the frame and the sub-frame B at the lower half and outputs frame data corresponding to these sub-frames to coders 28, 29, respectively.

If the coders 28, 29 are corresponding to, for instance, MPEG standard, the coding is executed in a prescribed unit of block. In this case, the frame divider 2 outputs block data in order from the left end block to the right end block of each sub-frame and from the first block line of the upper end of the sub-frame to the lower end block line.

The coders 28, 29 code input frame data and output to time stamp adders 31, 32, respectively. Time information is not inserted in the coded data streams from the coders 28, 29.

A clock circuit 5 generates clock data that becomes time information reference and outputs it to the time stamp adder 31 and also, to an adder 33. The adder 33 is also given with the output of a delay time setter 34. The delay time setter 34 generates a delay time based on the frame division in the frame divider 2. For instance, when the frame divider 2 sets the sub-frames A, B by dividing one field frame into the upper and lower halves, a delay time will become ½ field.

The adder 33 outputs clock data of the clock circuit 5 to the time stamp adder 32 by delaying it by a delay time (½ field period) set by the delay time setter 34. The time stamp adder 31 outputs the coded data stream from the coder 28 by adding the time information based on the clock data from the clock circuit 5. Further, the time stamp adder 32 outputs the coded data stream from the coder 29 by adding time information based on the clock data from the adder 33.

As a result, even if the coded data streams from the coders 28, 29 are data constructing a frame together, time information to be inserted is shifted by the set delay time.

The coded data streams from the time stamp adders 31, 32 are given to recorders 6, 7, respectively. The recorders 6, 7 record the input coded data streams on a recording medium (not shown), respectively. Further, the coded data streams from the time stamp adders 31, 32 may be transmitted by a transmitter (not shown) in some cases.

Further, the coded data streams from the time stamp adders 31, 32 may be supplied to a recomposer. The recomposer 8 recomposes the input coded data streams of the sub-frames A, B into one stream and supplies it to a transmitter 9. The transmitter 9 transmits the recomposed coded data stream. Further, the output of the recomposer 8 may be recorded on a recorder (not shown).

Now, the operation of this embodiment in the construction as described above will be explained.

The high-definition picture data is supplied to the frame divider 2 through the input terminal 1. The frame divider 2 divides a high-definition picture into the upper and lower sub-frames A, B of the frame and gives frame data of the sub-frame A to the coder 28 and frame data of the sub-frame B to the coder 29. The coders 28, 29 code the input frame data and outputs the coded data streams to the time stamp adders 31, 32.

On the other hand, the clock circuit 5 generates clock data and outputs to the time stamp adder 31 and also, to the adder 33. The delay time setter 34 sets up a ½ field period as a delay time. The adder 33 outputs the clock data to the time stamp adder 32 by delaying it by the ½ field period.

The time stamp adder 31 inserts time information based on clock data from the clock circuit 5 in the coded data stream from the coder 28. On the other hand, the time stamp adder 32 inserts time information based on clock data from the adder 33 in the coded data stream from the coder 29. The clock data of the adder 33 is delayed from the clock data from the clock circuit 5 by the ½ field period. Originally, the coded data streams of the sub-frames A, B at the corresponding frame positions are added with the same time information, however, in this embodiment the time information delayed by the ½ field period is added to the coded data streams corresponding to the sub-frame B.

The outputs of the time stamp adders 31, 32 are supplied to the recorders 6, 7, respectively and recorded on a recording medium (not shown), respectively. Further, the outputs of the time stamp adders 31, 32 are recomposed into one coded data stream by the recomposer 8 and then may be transmitted by the transmitter 9.

In a general decoder, the decoding is executed by comparing time information contained in input coded data streams with clock data of an internal clock. The time information added to the coded data of the coded data stream recorded by the recorder 7 is later than the coded data stream recorded by the recorder 6 by a ½ field period. If however the decoders 13 and 14 operate at a normal speed mode but not at a double speed mode, the frame combiner 17 can combine the sub-frames at a double speed. Accordingly, when the decoder performs the decoding based on the time information contained in the coded data stream, the reconstructed frame data of the sub-frame B are output in order immediately after all of the reconstructed frame data of the sub-frame A are output, for example, in case of that the decoders 13 and 14 output data at a double speed operation mode. Therefore, it is possible to reconstruct an original high-definition picture simply by combining these reconstructed frame data.

As described above, in this embodiment time information added to one of the coded data stream is delayed by a delay time corresponding to the frame division of each frame. As a result, at the decoding section it is possible to reconstruct an original high-definition picture without delaying the reconstructed frame data and obtain the same effect as the embodiment of FIG. 1.

Figure 6:
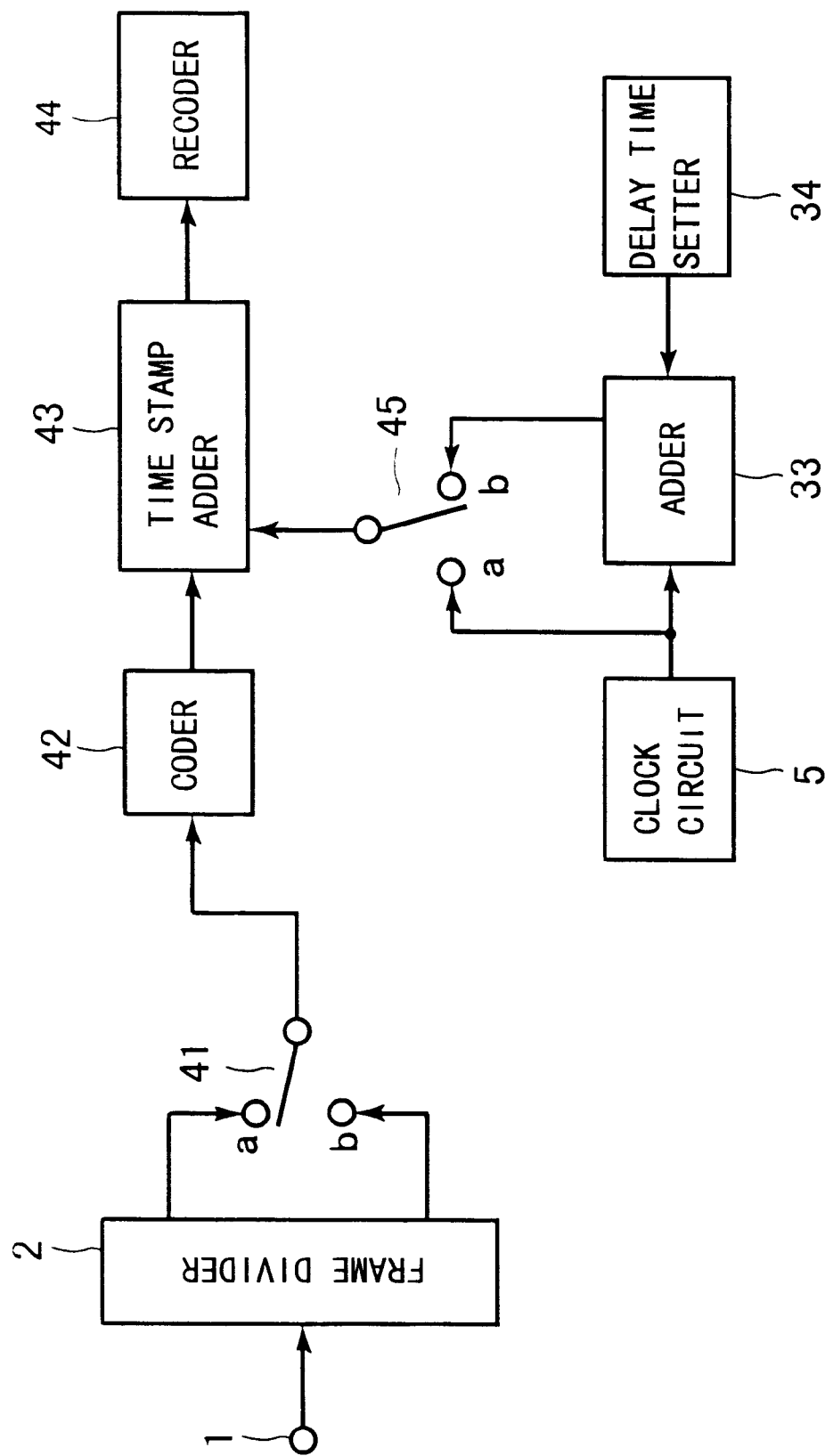
FIG. 6 is a block diagram illustrating another embodiment of the present invention.

FIG. 6 is a block diagram illustrating another embodiment of the present invention. In FIG. 6, the same component elements as those in FIG. 4 are assigned with the same numerical reference and the explanation is omitted. This embodiment is to code frame data of the sub-frames A, B through the time division process of one system processor.

Frame data of the sub-frame A from the frame divider 2 is supplied to the terminal a of a switch 41 and frame data of the sub-frame B is supplied to the terminal b of the sub-frame B. The switch 41 selects either the terminal a or b and gives the frame data of the sub-frames A, B to a coder 42 on the time division basis. The coder 42, a time stamp adder 43 and a recorder 44 are in the same construction as the coders 28, 29, the time stamp adders 431, 32 and the recorders 6, 7, respectively.

Clock data from the clock circuit 5 is given to the adder 33 and also, to the terminal a of a switch 45. From the adder 33, delayed clock data is given to the terminal b of the switch 45. When a coded data stream of frame data of the sub-frame A is output from the coder 42, the switch 45 selects the terminal a and gives the clock data from the clock circuit 5 to the time stamp adder 43 and when a coded data stream of frame data of the sub-frame B is output, the switch 45 selects the terminal b and gives the clock data from the adder 33 to the time stamp adder 43.

In the embodiment in the construction as described above, the coder 42, the time stamp adder 43 and the recorder 44 execute the process of the frame data of the sub-frames A, B on the time division basis. When the switch 41 selects the terminal a, the frame data of the sub-frame A is supplied to the coder 42 wherein the data are coded. This coded data stream is given to the time stamp adder 43 and added with time information. In this case, the switch 45 selects the terminal a and the clock data from the clock circuit 5 is added to a coded data stream corresponding to the sub-frame A.

Further, when the switch 41 selects the terminal b, the frame data of the sub-frame B is supplied to the coder 42 wherein the data are coded. This coded data stream is given to the time stamp adder 43 and is given with time information based on the clock data from adder 33 which is selected by the switch 45. The output of the time stamp adder 43 is recorded by the recorder 44.

As described above, in this embodiment it is possible to obtain the same effect as in the embodiment illustrated in FIG. 4. In addition, as the time division process is executed, the circuit scale can be made further small.

Figure 7:
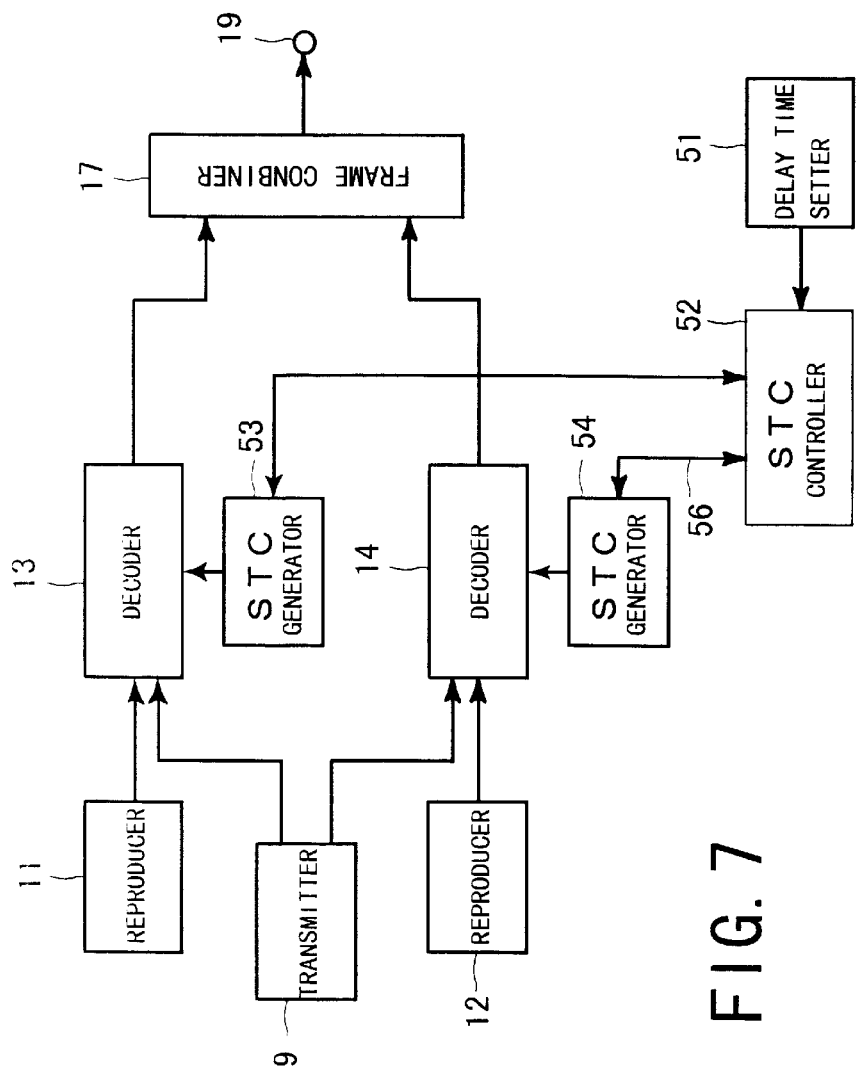
FIG. 7 is a block diagram illustrating another embodiment of the present invention.

FIG. 7 is a block diagram illustrating another embodiment of the present invention. This embodiment is an example of the invention applied to a decoder which decodes one frame from coded data streams of a frame that was divided into the upper and lower sub-frames and coded. In FIG. 7, the same component elements as those in FIG. 1 are assigned with the same reference numerals and the explanation thereof will be omitted.

In the embodiment in FIG. 1, the external synchronizing data are delayed and the reconstructed frame data are output at the timings corresponding to the positions in the frame. The external synchronizing data are used for synchronizing video signals of own machine and video signals of other equipment. In the embodiment of FIG. 1, it is only possible to set a time difference within one field period for the output timing. On the other hand, this embodiment makes it possible to set any output time difference at discretion.

In general, decoders decide output timings of reconstructed frame data based on System Time Clock (STC) (i.e., a synchronizing signal) internally generated in the circuits. The decoders 13, 14 are given with the STC from STC generators 53, 54, respectively. The STC generator is controlled by an STC controller 52 and generates STC.

A delay time setter 51 sets up a delay time based on the frame division at the coding section. For instance, if one field frame is divided into the upper and lower field sub-frames, a ½ field period is set as a delay time.

The STC controller 52 controls STC generators 53, 54 and gives a delay time difference based on the setting of the delay time setter 51 to STC generated by the STC generators. That is, the STC controller 52 first reads out an STC value generated from the STC generator 53 via a bus 55 and stores it. Then, the STC controller 52 reads out the STC value generated by the STC generator 54 via a bus 53 and stores a difference with the STC value generated from the STC generator 53. The STC controller 52 adds a delay time set by the delay time setter 51 to the stored differential value and sets up this added value again for the STC generator 54 as an STC value of the STC generator 54. Further, although such the setting of STC value is normally sufficient for only one time at the time when starting the decoding, this setting is performed not only when starting the decoding but also whenever a discontinuous point of time information is generated, for instance, when the power source is turned ON, the special reproduction is performed or input data streams are changed over, etc.

Now, the operation of the embodiment constructed as described above will be explained.

Figure 8:
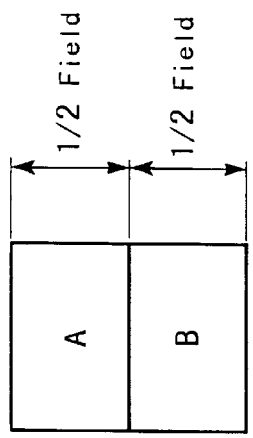
FIG. 8 is a diagram for explaining the embodiment of FIG. 7.

The coded data stream corresponding to the sub-frame A at the upper half of a high-definition picture, as shown in FIG. 8, is given to the decoder 13 and the coded data stream corresponding to the sub-frame B at the lower half of the frame is given to the decoder 14. The decoders 13, 14 decode the input coded data streams and reconstruct an original frame data.

The decoders 13, 14 output reconstructed frame data at the timings based on STC generated from the STC generators 53, 54. In this embodiment, an STC value generated by the STC generator 54 is set up again by the STC controller 52. That is, the STC controller 52 obtains a difference STC values generated by the STC generators 53, 54 and by adding a delay time that is set by the delay time setter 51 to this differential value and sets the added value again in the STC generator 54.

As a result, the decoding output from the decoder 14 is delayed against the decoded output from the decoder 13 by the delay time that is set by the delay time setter 51. That is, the reconstructed frame data from the decoder 14 is delayed from the reconstructed frame data of the sub-frame B on the corresponding position of the screen by the ½ field period.

Other actions are identical to those in the embodiment of FIG. 1.

Thus, in this embodiment it is possible to obtain the similar effects as in the embodiment of FIG. 1, and furthermore, it has an effect to be able to set up a delay time at discretion.

Further, although examples of dividing a frame into the upper and lower halves are explained in the embodiments described above, it is clear that this invention is also applicable even when a frame is divided according to other dividing methods.

As described above, the present invention can provide an extremely preferable frame combining apparatus which is able to reduce the circuit scale.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A frame combining apparatus, comprising:

a plurality of decoding means for decoding frame data for each of a plurality of sub-frames through a decoding process opposite to a coding process when a plurality of coded data streams obtained by coding frame data of a frame divided into a plurality of sub-frames are input;

synchronizing means for generating external synchronizing data for defining output timings of decoded outputs from a plurality of decoding means; and delaying means for generating more than one external synchronizing data delayed by a delay time corresponding to a plurality of sub-frames in response to the division of a frame and to give the external synchronizing data from the synchronizing means and external synchronizing data having a delay time corresponding to the divided sub-frames out of more than one delayed external synchronizing data to decoding means corresponding to the sub-frames, respectively.

2. A frame combining apparatus, comprising:

a plurality of coding means to obtain a plurality of coded data stream by dividing a frame into a plurality of sub-frames and coding frame data for each of divided sub-frames;

clock means for generating clock data for a plurality of the coding means to obtain a time reference when decoding frame data;

delaying means for generating more than one clock data which are the clock data from the clock means delayed by a delay time corresponding to the plurality of sub-frames in response to the division of a frame; and a plurality of time stamp adding means to output coded data streams corresponding to divided sub-frames by inserting time information based on clock data of delay time corresponding to respective sub-frames out of clock data from the clock means and clock data from the delaying means.

3. A frame combining apparatus claimed in claim 2, wherein a plurality of the coding means and the time stamp adding means are composed of single system coders to perform the time division process and time stamp adders.

4. A frame combining apparatus claimed in claim 2, further comprising a recomposing means to recompose the outputs of a plurality of the time stamp adding means to one coded data stream and output the recomposed coded data stream.

5. A frame combining apparatus, comprising:

a plurality of decoding means for decoding frame data of each of a plurality of the sub-frames through the decoding process opposite to the coding process when a plurality of coded data streams obtained by coding frame data of a frame divided into a plurality of sub-frames, are input;

synchronizing means for generating synchronizing data for defining output timings of decoded outputs from a plurality of the decoding means; and delaying means for generating more than one synchronizing data from the synchronizing means, which are delayed by a delay time corresponding to each of plural sub-frames according to the divided frame and give the synchronizing data from the synchronizing means and synchronizing data having a delay time corresponding to each sub-frame out of more than one delayed synchronizing data to the decoding means corresponding to each of the sub-frames.

* * * * *